US007024306B2

(12) United States Patent
Minami et al.

(10) Patent No.: US 7,024,306 B2
(45) Date of Patent: *Apr. 4, 2006

(54) EVALUATION SYSTEM FOR VEHICLE OPERATING CONDITIONS AND EVALUATION METHOD THEREOF

(75) Inventors: Katsuaki Minami, Nagano (JP); Satoshi Kumagai, Nagano (JP); Takao Hamuro, Nagano (JP); Hideki Nagahara, Nagano (JP)

(73) Assignee: Miyama, Inc., Nagano (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/625,506

(22) Filed: Jul. 24, 2003

(65) Prior Publication Data

US 2005/0021222 A1 Jan. 27, 2005

(51) Int. Cl.
*G06G 7/70* (2006.01)
*G06F 19/00* (2006.01)

(52) U.S. Cl. .......................... 701/123; 701/29; 701/30; 73/113; 73/114; 123/406.23; 340/450.2; 340/439

(58) Field of Classification Search ............ 701/29–30, 701/35–36, 123, 1; 73/112–114, 118.1, 118.2, 73/119 A; 340/438–439, 441, 450.2, 450, 340/457.4; 123/445–446, 495, 512, 436, 123/406.23, 352, 406.12; 702/176–178, 702/182–186

See application file for complete search history.

(56) References Cited

U.S. PATENT DOCUMENTS 4,247,757 A * 1/1981 Crump, Jr. ................. 235/61 J
4,286,560 A * 9/1981 Sagisaka et al. ....... 123/406.23
4,354,173 A * 10/1982 Kuhn et al. ................. 340/439
4,398,174 A * 8/1983 Smith, Jr. ................ 340/450.2
4,494,404 A * 1/1985 Strifler ......................... 73/113
4,630,027 A * 12/1986 Muhlberger et al. ..... 340/457.4
4,677,556 A * 6/1987 Habu .......................... 701/64
4,845,630 A * 7/1989 Stephens .................... 701/123
4,853,673 A * 8/1989 Kido et al. ................. 340/439
5,006,994 A * 4/1991 Andersson et al. ......... 701/123
5,578,748 A * 11/1996 Brehob et al. ................ 73/114
5,652,378 A * 7/1997 Dussault ....................... 73/114
5,954,617 A * 9/1999 Horgan et al. .............. 477/107
6,026,784 A * 2/2000 Weisman et al. ........... 123/436
6,092,021 A * 7/2000 Ehlbeck et al. ............. 701/123

FOREIGN PATENT DOCUMENTS

JP 2000-205925 7/2000
WO WO 200058131 A1 * 10/2000

* cited by examiner

*Primary Examiner*—Jacques H. Louis-Jacques
(74) *Attorney, Agent, or Firm*—Rabin & Berdo, PC

(57) ABSTRACT

A calculation unit (3) determines whether or not an operation which worsens fuel economy has been performed, and if it is determined that an operation which worsens fuel economy has been performed, the calculation unit (3) respectively calculates the actual amount of consumed fuel and an amount of fuel that would have been consumed had the operation that worsens fuel economy not been performed. The calculation unit (3) then calculates an amount of fuel consumed in excess due to the operation which worsens fuel economy by subtracting the amount of fuel that would have been consumed had the operation that worsens fuel economy not been performed from the actual amount of consumed fuel. A display (4) displays the calculated excess fuel consumption amount.

7 Claims, 15 Drawing Sheets

| ☐ IDLING | |
|---|---|
| NUMBER OF STOPPAGES | 4 |
| STOPPAGE TIME | 99.7sec |
| NUMBER OF ENGINE STOPPAGES | 1 |
| ENGINE STOPPAGE TIME | 24.4sec |
| IDLING TIME | 75.3sec |
| IDLING TIME/STOPPAGE TIME | 76% |

☐ ACCELERATION

| | |
|---|---|
| ACCELERATION TIME | 505sec |
| RAPID ACCELERATION TIME | 73sec |
| RAPID ACCELERATION TIME/ ACCELERATION TIME | 14% |

| | |
|---|---|
| DECELERATION TIME | 362sec |
| RAPID DECELERATION TIME | 73sec |
| RAPID DECELERATION TIME/ DECELERATION TIME | 20% |

| | | | |
|---|---|---|---|
| OVERALL RUNNING TIME | 1060sec | OVERALL RUNNING TIME | 5160sec |
| EXCESS SPEED RUNNING TIME | 220sec | EXCESS SPEED RUNNING TIME | 1500sec |
| EXCESS SPEED RUNNING TIME/ OVERALL RUNNING TIME | 20% | EXCESS SPEED RUNNING TIME/ OVERALL RUNNING TIME | 29% |

☐ SELECT LEVER OPERATION

| | |
|---|---|
| RUNNING TIME in 2nd,3rd,4th GEARS | 329sec |
| UPSHIFT POSSIBLE TIME | 154sec |
| UPSHIFT POSSIBLE TIME/RUNNING TIME in 2nd,3rd,4th GEARS | 46% |

| ☐ CONSTANT SPEED RUNNING | |
|---|---|
| CONSTANT SPEED TIME | 84.7sec |
| RUNNING TIME | 1060.4sec |
| CONSTANT SPEED TIME/ RUNNING TIME | 7.9% |

| ☐ RACING | |
|---|---|
| NUMBER OF RACING TIMES | 30 |
| NUMBER OF STOPPAGES | 98 |
| NUMBER OF RACING TIMES/ NUMBER OF STOPPAGES | 30% |

EVALUATION SYSTEM FOR VEHICLE OPERATING CONDITIONS AND EVALUATION METHOD THEREOF

1. Field of the Invention

This invention relates to a system for evaluating—vehicle operating conditions such as fuel economy.

2. Description of the Related Art

JP2000-205925A, published by the Japan Patent Office in 2000, discloses a fuel economy display device. This device calculates fuel consumption on the basis of a fuel injection pulse signal outputted from an engine controller, calculates traveled distance on the basis of a vehicle speed pulse signal outputted from a vehicle speed sensor, and calculates and displays the fuel economy by dividing the calculated traveled distance by the fuel consumption.

SUMMARY OF THE INVENTION

By means of this fuel economy display device, a driver can learn the fuel economy while in motion. However, simply displaying the fuel economy cannot be said to be sufficient in aiding the improvement of driving skills since the driver cannot learn specifically how to improve driving operations in order to enhance fuel economy and does not know the degree to which fuel economy is enhanced by improving driving operations.

In order to help a driver improve his/her driving skills, ideal driving operations must be displayed to the driver and the driver must be caused to recognize the actual extent to which his/her driving adversely affects fuel economy. Further, it is desirable that this information be provided to the driver without inducing a sense of aversion thereto.

Here, ideal driving operations for improving fuel economy include driving operations such as traveling in an appropriate gear position to avoid large increases in engine rotation speed and increasing speed without depressing the accelerator pedal excessively. These driving operations are defined specifically as follows.

The solid lines in FIG. 17 illustrate the relationship between vehicle speed at a steady speed (zero acceleration) and fuel economy. The numerals beside the solid lines indicate the gear position of the transmission. When the engine rotation speed increases, friction inside the engine and air resistance acting on the vehicle body increase, and thus when the vehicle speed increases in each gear position, fuel economy deteriorates. The maximum speed in each gear position is the maximum engine rotation speed or a rotation speed directly before reaching a speed at which there is a danger of engine failure.

When traveling at a certain steady vehicle speed, fuel economy improves when a high speed side gear is used. When traveling at a vehicle speed V, for example, a vehicle may be driven at the vehicle speed V at a point S or a point R in the figure, but fuel economy is better if the vehicle is driven at the point R than the point S. Hence, if traveling at the point S, fuel economy can be improved by shifting up as shown by an arrow A. If the accelerator is gradually depressed from the point R, the vehicle speed increases along an arrow B and the vehicle travels at a steady speed at a point at which drive force and running resistance balance. If excessive drive force is extremely small, the fuel economy deteriorates gradually as shown by the arrow B, but due to the presence of even a slight accelerating resistance, the actual fuel economy is worse.

To obtain a large acceleration, the accelerator must be depressed greatly without changing the gear position or speed must be increased in a lower gear position. In this case, however, fuel economy deteriorates greatly as shown in FIG. 18. Zero acceleration in FIG. 18 corresponds to the steady running in FIG. 17.

Although the same acceleration can be obtained in a plurality of gear positions, fuel economy improves as the gear position increases. When obtaining an acceleration a in FIG. 18, for example, the fuel economy can be improved from C to D by traveling in second gear rather than first gear. This is because in so doing, the engine is operated in or in the vicinity of a region of a favorable fuel consumption ratio which is shown by the diagonally shaded portion in FIG. 19.

The wide arrows P in FIGS. 17 through 19 indicate the directions in which the fuel consumption ratio worsens. The arrows P generally match the directions of increase in NOx and smoke. This is because a diesel engine is operated at a leaner air/fuel ratio (excess air ratio $\lambda>1$, equivalence ratio $\phi<1$) than stoichiometric air/fuel ratio (approximately 14.9), and hence, as shown in FIG. 20, when attempting to obtain greater engine torque, stoichiometric air/fuel ratio is neared from the leaner air/fuel ratio with the result that the fuel economy worsens and NOx and smoke increase.

Hence, ideal driving operations signify "gentle driving" in which as high a gear as possible is used both when accelerating and driving at a steady speed, and the accelerator is depressed to a degree at which the engine rotation speed reaches an intermediate speed. Implementing such "gentle driving" leads not only to improvements in fuel economy, but also to reductions in NOx and smoke.

It is therefore an object of this invention to provide a driver with information which aids driving skill enhancement, to improve fuel economy through improvements in driving operations, and to realize low engine emissions.

According to this invention, an operating condition evaluation system comprising a controller and a display device is provided. The controller determines whether an operation which worsens fuel economy has been performed, and when it is determined that an operation which worsens fuel economy has been performed, the controller calculates the actual amount of fuel consumed and the amount of fuel that would have been consumed had the operation which worsens fuel economy not been performed. The amount of fuel that would have been consumed had the operation which worsens fuel economy not been performed is then subtracted from the actual amount of fuel consumed to calculate the excess amount of fuel consumed due to the operation which worsens fuel economy. The display device displays the calculated excess fuel consumption.

According to this invention, when an operation which worsens fuel economy, such as rapid acceleration, is performed, the extra amount of fuel consumed (excess fuel consumption) is calculated and displayed. When an operation which worsens fuel economy is performed, this is immediately converted into an increase in excess fuel consumption and displayed as such. As a result, a driver can recognize the driving operation which caused the deterioration in fuel economy, and this can be used as a reference when improving driving operations. Moreover, the driver can be caused to recognize the extent to which fuel economy is worsened by his/her driving operations, and thus the driver can be encouraged to improve his/her driving skill.

Embodiments and advantages of this invention will be described in detail below with reference to the attached drawings.

DESCRIPTION OF THE PREFERRED EMBODIMENTS

Figure 1:
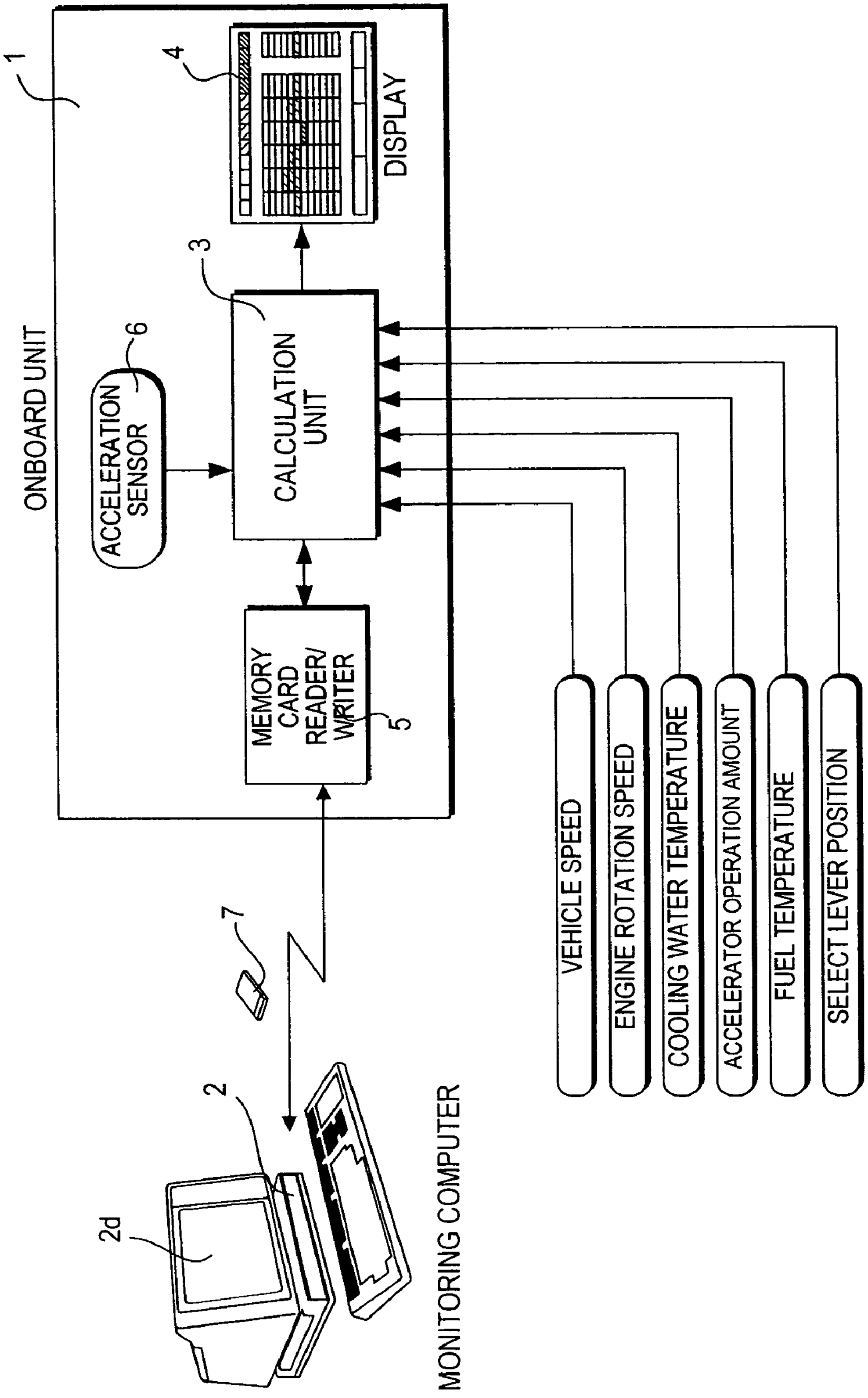
FIG. 1 is a block diagram showing the constitution of an evaluation system for vehicle operating conditions according to this invention.

FIG. 1 is a block diagram showing the constitution of an evaluation system for vehicle operating conditions according to this invention. This system includes an onboard unit 1 which is mounted in a vehicle subject to evaluation and a monitoring computer 2 for monitoring the vehicle.

The onboard unit 1 includes a calculation unit 3 comprising a CPU, memory, and an input/output interface, a display 4 such as an LCD, a memory card reader/writer 5, and an inbuilt acceleration sensor 6. The display 4 is mounted in the vehicle in a position where it can be easily seen by the driver.

Signals outputted from the vehicle subject to evaluation such as a vehicle speed signal, an engine rotation speed signal, a cooling water temperature signal, an accelerator operation amount signal, a fuel temperature signal, a select lever position signal, and so on, and an acceleration signal from the inbuilt acceleration sensor 6 are inputted into the calculation unit 3. These vehicle output signals may be obtained from an engine controller or transmission controller, or may be obtained directly from sensors which detect these signals.

The calculation unit 3 calculates operating conditions such as fuel economy and excess fuel consumption on the basis of the various input signals, vehicle data and an overall engine performance map read from the memory card 7. The calculation unit 3 displays the calculated operating conditions on the display 4 and records the operating conditions on the memory card 7 using the memory card reader/writer 5.

Figure 2A:
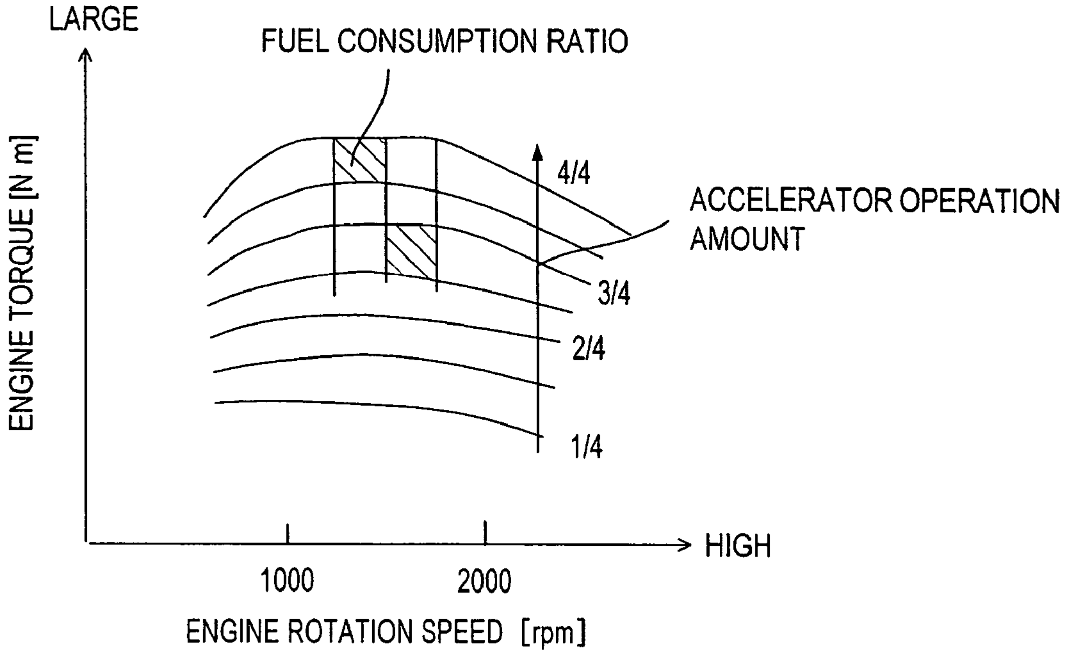
FIGS. 2A and 2B show overall engine performance maps, FIG. 2A being a map defining the relationship of the fuel consumption ratio to engine rotation speed and engine torque, and FIG. 2B being a map defining the relationship of engine torque and fuel consumption to engine rotation speed and accelerator operation amount.

The overall engine performance map is typically a map showing the relationship of the fuel consumption ratio (BSFC) to engine rotation speed and engine torque, as shown in FIG. 2A (each shaded square contains the fuel consumption ratio at that engine rotation speed and engine torque). As is, however, the overall engine performance map is inconvenient for use since the engine torque must be calculated in order to determine the fuel consumption ratio.

Figure 2B:
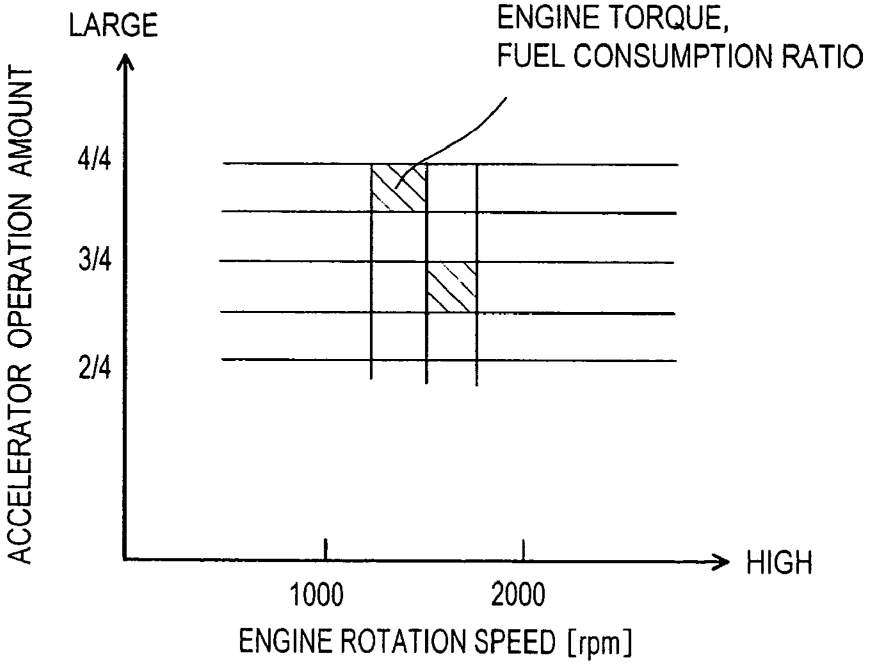

Hence in this case, as shown in FIG. 2B, the overall performance map is rewritten such that the ordinate shows the accelerator operation amount (or throttle valve opening) and the abscissa shows the engine rotation speed such that each shaded square contains the engine torque and fuel consumption ratio under those operating conditions.

The monitoring computer 2 comprises a vehicle database and monitoring software. The monitoring computer 2 performs transactions with the onboard unit 1 by way of the memory card 7, which is a recording medium capable of reading and writing, of various data required in the calculation of the operating conditions and the calculation results of the operating conditions recorded when traveling.

The monitoring computer 2 is used to automatically generate an overall engine performance map for the vehicle subject to evaluation, to record the overall engine performance map and data required to calculate the operating conditions on the memory card 7, and to analyze and display the data recorded on the memory card 7 by means of the onboard unit 1. The specific content of this system will be described below.

1. Setting Vehicle Data Subject to Evaluation

When evaluating the operating conditions of a vehicle with this system, first the vehicle to be evaluated by the monitoring computer 2 is selected from the vehicle database. Examples of items that are selected include the name of the manufacturer, the model, the year of manufacture, the engine type, the rotation speed while idling, the gross mass of the vehicle, the deceleration ratio of the differential gear unit, the gear ratio of the transmission in each gear position, the type of wind deflector, the body type, and the tire size. The items corresponding to the vehicle to be evaluated are respectively selected.

When the selection is completed, data which are unique to the selected vehicle, for example engine performance data such as maximum engine torque, engine rotation speed at the maximum engine torque, maximum drive force, minimum fuel consumption ratio, and engine rotation speed at the minimum fuel consumption ratio, vehicle body characteristic data such as the front projected surface area and the air resistance coefficient, the relationship between engine rotation speed and engine rotation pulse, the relationship between vehicle speed and vehicle speed pulse, and so on are automatically selected. The selected data are written to the memory card 7.

From among the selected data, the engine performance data and vehicle body characteristic data may be extracted from catalogues, maintenance manuals, and other documentation distributed by the vehicle manufacturer, and hence when creating the database, there is no need to collect these data by conducting driving tests. The relationship between engine rotation speed and engine rotation pulse and the relationship between vehicle speed and vehicle speed pulse may be acquired from the output signals of the engine controller mounted in each vehicle.

In order to create the overall engine performance map using the monitoring computer 2, torque pattern verification for the vehicle to be evaluated is performed based on several types of representative torque patterns which are prepared in advance on the basis of the torque of the vehicle to be evaluated stored in the vehicle database.

The fuel consumption ratios of engines having similar torque patterns have substantially identical characteristics regardless of the engine type (engine displacement and the like), and hence fuel consumption ratio characteristics are determined by selecting fuel consumption ratio characteristic data which correspond to the torque pattern of the subject vehicle from among the fuel consumption ratio characteristic data corresponding to the representative torque patterns prepared in advance. By then combining the selected fuel consumption ratio characteristic data with a minimum fuel consumption ratio, which is an actual value, the fuel consumption ratio under the remaining operating conditions is calculated, and the fuel consumption ratio data of the overall engine performance map are generated.

When the engines of vehicles subject to evaluation have a similar torque pattern, only one set of fuel consumption ratio characteristic data need be provided, and the torque pattern verification described above is not required.

Figure 3:
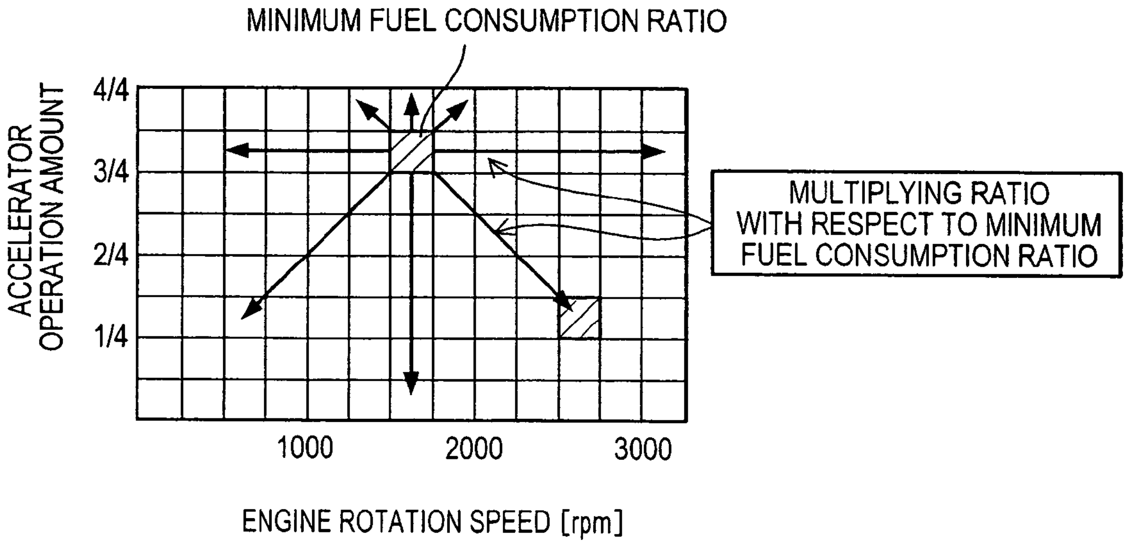
FIG. 3 is a diagram schematically illustrating a situation in which fuel consumption ratio data of the overall engine performance map are automatically generated.

FIG. 3 shows a situation in which the fuel consumption ratio data of the overall engine performance map are automatically generated. As described above, if the torque pattern is known, then the fuel consumption ratio characteristic of the related engine may be understood, and hence if the minimum fuel consumption ratio, which is one of the actual values, is given, then the fuel consumption ratio in all operating conditions can be obtained by using the corresponding ratios as multipliers. The torque data of the overall engine performance map can be obtained from the engine output characteristics stored in the database.

Thus the monitoring computer 2 automatically generates the overall engine performance map comprising the fuel consumption ratio data and engine torque data and records the generated map on the memory card 7.

When the various data required to calculate the operating conditions has been written in the memory card 7, the memory card 7 is inserted into the memory card reader/writer 5 of the onboard unit 1, and the various data required to calculate the operating conditions are read into the onboard unit 1.

2. Initial Adjustment of Sensors and Correction of Overall Engine Performance Map Once the required data have been read, the calculation unit 3 of the onboard unit 1 performs initial adjustment of the accelerator operation amount sensor and the inbuilt acceleration sensor 6. Initial adjustment of the accelerator operation amount sensor is performed by detecting the sensor output value when the accelerator pedal is fully released and fully depressed, for example. Initial adjustment of the inbuilt acceleration sensor 6 is performed using a spirit level attached to a device.

When the initial adjustment of the sensors is completed, the vehicle is then actually driven, and the calculation unit 3 corrects the torque data of the overall engine performance map on the basis of the data measured at that time. The basis for correcting the overall engine performance map is that there is a discrepancy between the catalog performance and the actual performance of an engine, and this discrepancy must be corrected in order to calculate an accurate operating condition. Correction is performed based on the data measured during the first run after the onboard unit 1 has been installed in the vehicle.

Specifically, the torque data during full throttle running is calculated by driving the vehicle under first trace conditions (an accelerator operation amount of over 70%), and the accelerator operation amount and engine rotation speed at a specified torque are measured by driving the vehicle under second trace conditions (an accelerator operation amount of 30 to 70%). Each of the trace conditions is set at zero road incline, at a specified water temperature value, in a state of acceleration, and with the vehicle empty. The engine torque Te [N·m] is calculated according to the following equation (1).

$$Te = \frac{R \cdot r}{it \cdot if \cdot \eta} \tag{1}$$

R is running resistance [N] calculated using equations (2) to (7) described below, r is a dynamic load radius of the tire [m], it is a speed ratio in the current gear position, if is a deceleration ratio of the differential gear unit, and η is transmission efficiency.

The torque data of the overall engine performance map are corrected based on a comparison between the measured data and the overall engine performance map. By correcting based on running data during full load running and partial load running, the torque data of the overall engine performance map can be corrected to a substantially accurate value.

3. Calculation and Determination of Operating Conditions Based on Running Data

Once the overall engine performance map having accurate torque data is obtained in the manner described above, the calculation unit 3 begins calculation and determination of the operating conditions that will be used in the evaluation. More specifically, first basic data are calculated, and the calculation and determination of the operating conditions are performed using the calculation results for these basic data.

3.1. Calculation of Basic Data

A rolling resistance coefficient μr, the running resistance R, and the drive force F are calculated as the basic data used in the calculation of the operating condition.

The rolling resistance coefficient μr is a value used when calculating the rolling resistance Rr described below, and this coefficient varies according to the road surface condition (dry, rain, dew, snow, or other weather conditions), the type of tire, degree of wear, and so on. The data used in the calculation of the rolling resistance coefficient μr are measured while the accelerator operation amount is at 0% and the clutch is released. For example, if data measurement is performed at the moment of a shift change (which is a short time period but satisfies the above conditions), the data required in the calculation of the rolling resistance coefficient μr can be measured without demanding of the driver any particular operations for data measurement. More specifically, the rolling resistance coefficient μr is calculated according to the following equation (2) based on a speed v1 [m/sec] at the start of deceleration and a speed v2 [m/sec] after a predetermined length of time Δt.

$$\mu r = \frac{1}{g} \cdot \frac{v1 - v2}{\Delta t} \quad (2)$$

In the equation, g is gravitational acceleration (=9.8 [m/sec$^2$]). (The same follows for other formulas.)

Next, the gradient resistance Rs [N], the acceleration resistance Ra [N], the air resistance RI [N], and the rolling resistance Rr [N] are each obtained and the running resistance R [N] is calculated according to the following equation (3).

$$R = Rr + RI + Rs + Ra \quad (3)$$

A gradient angle θ is obtained from the difference between the acceleration which includes the vertical direction detected by the inbuilt acceleration sensor 6 and the vehicle forward/backward acceleration a which is calculated based on the vehicle speed signal, and the gradient resistance Rs is calculated according to the following equation (4).

$$Rs = M \cdot g \cdot \sin\theta \quad (4)$$

M [kg] is the gross mass of the vehicle.

The acceleration resistance Ra is the resistance caused by inertial force which operates when the vehicle accelerates or decelerates. The acceleration resistance Ra is calculated according to the following equation (5) based on the vehicle gross mass M [kg] and the vehicle forward/backward acceleration α [m/sec$^2$] which are calculated based on the vehicle speed signal.

$$Ra = \alpha \cdot M \quad (5)$$

The air resistance RI is the resistance created from the impact of the vehicle body with air while running. The air resistance RI is calculated according to the following equation (6) on the basis of the air density ρ [kg/m$^3$], the air resistance coefficient Cd, the front projected surface area A [m$^2$], and the vehicle speed V [m/sec].

$$RI = \frac{1}{2} \cdot \rho \cdot Cd \cdot A \cdot V^2 \quad (6)$$

The rolling resistance Rr is the resistance created between the tire and the road surface. The rolling resistance Rr is calculated according to the following equation (7) based on the gross mass M [kg] of the vehicle and the rolling resistance coefficient μr.

$$Rr = \mu r \cdot M \cdot g \quad (7)$$

The drive force F [N] is the force that moves the vehicle according to the output from the engine. The drive force F is calculated according to the following equation (8) based on the engine torque Te [N·m] obtained by referencing the overall engine performance map, the speed ratio it of the currently selected gear position, the deceleration ratio if of the differential gear unit, the transmission efficiency η, and the dynamic load radius of the tire r[m].

$$F = \frac{Te \cdot it \cdot if \cdot \eta}{r} \quad (8)$$

3.2. Calculation and Determination of the Operating Condition

The calculation unit 3 uses the calculated basic data to calculate and determine the operating conditions. The calculation and determination of the operating conditions includes calculation of the fuel consumption and fuel economy, calculation of the excess drive force and excess drive force ratio, calculation of the excess fuel consumption, determination of idling, determination of rapid acceleration and rapid deceleration, determination of excess speed, determination of the possibility of an upshift, determination of constant speed running, and determination of racing. These calculation and determination processes are described below.

(1) Calculation of Fuel Consumption and Fuel Economy

The fuel consumption Q is calculated by first determining the engine output Pe [kW] according to the following equation (9) based on the engine rotation speed Ne [rpm] and the engine torque Te [N·m] obtained from the engine rotation speed Ne and the accelerator operation amount AOA by referring to the overall engine performance map.

$$Pe = \frac{\pi \cdot Te \cdot Ne}{30} \cdot \frac{1}{1000} \quad (9)$$

The fuel consumption Q [l] is calculated according to the following equation (10) based on the engine output Pe, the fuel consumption ratio BSFC [g/(kW·hour)] obtained on the basis of the engine rotation speed Ne and the accelerator operation amount AOA with reference to the overall engine performance map, the fuel density ρ [kg/l], and the running time h [hour].

$$Q = \frac{BSFC \cdot Pe \cdot \mathrm{h}}{\rho \cdot 1000} \quad (10)$$

The fuel economy FE [km/l] is calculated according to the following equation (11) based on the fuel consumption Q [l], and the running distance D [km] obtained by integrating the vehicle speed which is obtained on the basis of the vehicle speed signal.

$$FE = \frac{D}{Q} \quad (11)$$

The mean fuel economy over a past predetermined length of time, or the current instantaneous fuel economy may, for example, be calculated as the fuel economy. When a comparison is made with past fuel economy data and the optimal value of the mean fuel economy is taken, the value thereof is recorded as the optimum fuel economy.

(2) Calculation of the Excess Drive Force and Excess Drive Force Ratio.

The excess drive force Fex is the value that results from subtracting the value of the running resistance R excluding the acceleration resistance Ra (=Rs+RI+Rr) from the drive force F transmitted to the driving wheels from the engine. If the excess drive force Fex is negative, then the vehicle is decelerating, and if positive, the vehicle is accelerating. If the excess drive force Fex is extremely high, it can be estimated that unnecessary drive force is being expended, and thus it can be determined that a shift to a higher gear is required immediately, or that an operation is required to reduce the accelerator operation amount.

Figure 4:
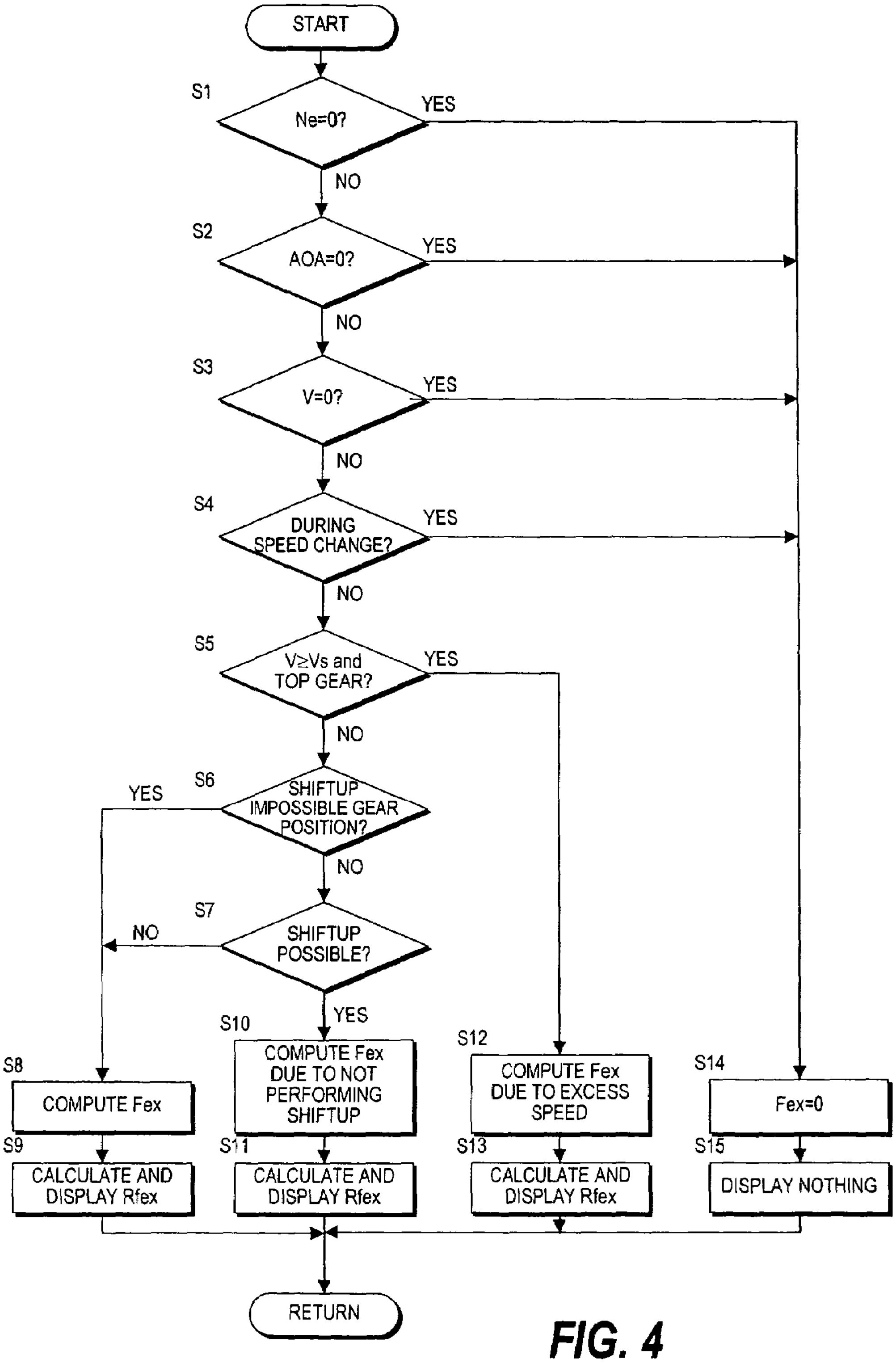
FIG. 4 is a flowchart illustrating calculation processing of an excess drive force and an excess drive force ratio, and display processing of the calculated excess drive force ratio.

FIG. 4 shows the calculation process for the excess drive force and excess drive force ratio, and the process for displaying the calculated excess drive force ratio on the display 4. This processing is executed repeatedly at predetermined time intervals by the calculation unit 3.

First, in steps S1 through S3, a determination is made as to whether or not the engine rotation speed Ne, the accelerator operating amount AOA, and the vehicle speed V are respectively zero. If any one of the engine rotation speed Ne, the accelerator operating amount AOA, and the vehicle speed V is zero, then the process advances to steps S14 and S15, and the excess drive force Fex is set to zero. In this case, nothing is displayed on the display 4.

In a step S4, a determination is made as to whether or not a speed change is currently being performed, or in other words whether the clutch is disengaged. If it is determined that a speed change is being performed, the process advances to the steps S14, S15, and in this case also, the excess drive force Fex is set to zero and nothing is displayed on the display 4.

If it is determined that a speed change is not being performed, then the process advances to a step S5, where a determination is made as to whether or not the current vehicle speed V is higher than a specified vehicle speed Vs, and whether or not the gear position is top gear (fifth gear in a five forward speed transmission). The specified vehicle speed Vs is set to 50 [km/hour] for running on ordinary roads and 80 [km/hour] for running on expressways, for example. When the vehicle speed V is greater than the specified vehicle speed Vs and the gear position is the top gear, the process advances to a step S12, where the excess drive force Fex due to excess speed is computed.

To calculate the excess drive force Fex due to excess speed, first the air resistance Ra at the current vehicle speed V and the air resistance Ras at the specified vehicle speed Vs are respectively calculated. The difference between the two is then calculated as excess air resistance Raex. The result of adding the excess air resistance Raex to the excess drive force Fex that is obtained by subtracting the running resistance R excluding acceleration resistance from the drive force F is calculated as the excess drive force Fex due to excess speed. Once the excess drive force Fex due to excess speed is calculated, the process advances to a step S13.

In the step S13, the excess drive force ratio Rfex is calculated according to the following equation (12) and displayed on the display 4.

$$Rfex = \frac{Fex}{F\max} \times 100 \tag{12}$$

It should be noted, however, that when the vehicle is running at a constant speed and the ratio [%] corresponding to the current drive force of the excess air resistance Raex is greater than the excess drive force ratio Rfex, then this ratio is displayed on the display 4 in lieu of the excess drive force ratio Rfex.

When the vehicle is running at a lower speed than the specified vehicle speed Vs, or when the gear position is not the top gear, the process advances to a step S6. In the step S6, a determination is made as to whether the gear position is a gear position at which an upshift is impossible (fifth gear or reverse gear in a five forward speed transmission). If the gear position is a position at which an upshift is impossible, then the process advances to a step S8. In the step S8, the excess drive force Fex is calculated by subtracting the running resistance R excluding acceleration resistance from the current drive force F. In a step S9, the excess drive force ratio Rfex is calculated according to the above equation (12) and displayed on the display 4.

If it is determined in the step S6 that the gear position is not a position at which an upshift is impossible, the process advances to a step S7. In the step S7, a determination is made as to whether or not an upshift is possible. The determination as to whether or not an upshift is possible is made as follows. First, an engine rotation speed Neup assuming that a single speed upshift has been performed is obtained, whereupon an engine torque Teupmax at full load at the engine rotation speed Neup when performing a single speed upshift is calculated with reference to the overall performance map. Then, a drive force (maximum drive force) Fupmax at full load when performing a single speed upshift is calculated based on the engine torque Teupmax at full load. If the engine rotation speed Neup after a single speed upshift is greater than the specified rotation speed, and if the maximum drive force Fupmax after a single speed upshift is greater than the running resistance R (=RS+RI+Rr), it is determined that an upshift is possible, and if not, it is determined that an upshift is not possible.

If an upshift is not possible, then the process advances to steps S8, S9, where the excess drive force Fex is calculated by subtracting the running resistance R from the current drive force F. The excess drive force ratio Rfex is then calculated according to the above equation (12) and displayed on the display 4.

If it is determined that an upshift is possible, then the process advances to a step S10 and the excess drive force Fex when an upshift is possible is calculated. The excess drive force Fex when an upshift is possible is calculated by obtaining an excess fuel consumption Qexup caused by not performing an upshift, which is the difference between the fuel consumption Qup (the method of calculation of which is described below) expected to occur as a result of an upshift and the current fuel consumption Q, and converting this into drive force. The conversion value to drive force is calculated by converting the excess fuel consumption Qexup to torque with the aid of a relational expression between the engine torque and the fuel consumption derived from the equations (9) and (10), and by further substituting this into equation (8).

In a step S11, the excess drive force Fex and the maximum drive force Fupmax after a single speed upshift are substituted into the equation (12), whereby the excess drive force ratio Rfex is calculated and displayed on the display 4. When the vehicle is running at a constant speed and the ratio [%] of the excess drive force Fex to the current drive force F is greater than the excess drive force ratio Rfex, this ratio is displayed on the display 4 in lieu of the excess drive force ratio Rfex.

(3) Calculation of the Excess Fuel Consumption

The excess fuel consumption Qex is the amount of fuel consumed in excess due to driving that worsens fuel economy such as the use of excess drive force Fex. The excess fuel consumption Qex is calculated as the difference between the actual amount of fuel consumed and the fuel consumption when it is assumed that an operation which worsens fuel economy has not been performed. By referring to the excess fuel consumption Qex, the amount of fuel consumed in excess, or in other words the amount of fuel that can be saved by improving driving operations, can be known.

The excess fuel consumption Qex is calculated as the sum of the excess fuel consumption Qexf due to the use of excess drive force, the excess fuel consumption Qexsp due to excess speed, the excess fuel consumption Qexup caused by not performing an upshift, the excess fuel consumption Qexrc caused by racing, and the excess fuel consumption Qexidl caused by idling.

The excess fuel consumption Qexf due to the use of excess drive force is the amount of fuel consumed in excess by using the excess drive force Fex, and is calculated based on the excess drive force Fex. More specifically, first the excess torque Tex [N·m] is obtained from the excess drive force Fex according to the following equation (13).

$$Tex = \frac{Fex \cdot r}{it \cdot if \cdot \eta} \tag{13}$$

In the equation, r [m] is the dynamic load radius of the tire [m], it is the gear ratio of the current gear position, if is the deceleration ratio of the differential gear unit, and η is the transmission efficiency. The excess output Pex [kW] is then calculated from the excess torque Tex according to the following equation (14).

$$Pex = \frac{\pi \cdot Tex \cdot Ne}{30 \cdot 1000} \tag{14}$$

The excess fuel consumption Qexf due to the use of excess drive force is calculated from the excess output Pex with the aid of the following equation (15).

$$Qexf = \frac{Pex \cdot BSFC \cdot \mathrm{h}}{\rho \cdot 1000} \tag{15}$$

The result of totaling the excess fuel consumption Qexf due to the use of excess drive force is recorded on the memory card 7.

The excess fuel consumption Qexsp due to excess speed is the amount of fuel consumed in excess as a result of increased air resistance caused when the vehicle is driven at a higher speed than the specified vehicle speed Vs. The specified vehicle speed Vs is set to 50 [km/hour] on ordinary roads and 80 [km/hour] on expressways, for example. The excess fuel consumption Qexsp due to excess speed is calculated as the difference between the fuel consumption Q at the time of excess speed and the fuel consumption Qs expected at the time of the specified vehicle speed. More specifically, first the drive force Fs at the time of the specified vehicle speed, excluding the increased portion of air resistance due to excess speed (=the current air resistance Rl−the specified vehicle speed air resistance Rls) from the current air resistance Rl, is calculated according to the following equation (16) with the running resistance R (=Rr+Rs+Ra) serving as the same condition.

$$F = \frac{Te \cdot it \cdot if \cdot \eta}{r} = Rr + Rl + Rs + Ra \tag{16}$$

From the drive force Fs at the time of specified vehicle speed Vs, the engine torque Tes [N·m] at the time of specified vehicle speed Vs is obtained according to the following equation (17).

$$Tes = \frac{Fs \cdot r}{it \cdot if \cdot \eta} \tag{17}$$

The engine rotation speed Nes [rpm] at the time of specified vehicle speed Vs is calculated from the following equation (18).

$$Nes = \frac{Vs \cdot it \cdot if \cdot 1000}{2\pi r \cdot 60} \tag{18}$$

The fuel consumption ratio BSFC [g/(kW·hour)] corresponding to the engine rotation speed Nes and engine torque Tes at the time of the specified vehicle speed Vs is determined by referencing the overall engine performance map, and the engine output Pes [kW] at the time of the specified vehicle speed Vs is obtained according to the following equation (19).

$$Pes = \frac{\pi \cdot Tes \cdot Ne}{30 \cdot 1000} \tag{19}$$

The fuel consumption Qs [l] at the time of the specified vehicle speed Vs is then obtained with the aid of the following equation (20).

$$Qs = \frac{Pes \cdot BSFC \cdot \mathrm{h}}{\rho \cdot 1000} \tag{20}$$

The excess fuel consumption Qexsp due to excess speed is calculated by subtracting the fuel consumption Qs at the time of the specified vehicle speed Vs from the current fuel consumption Q. The total value of the calculated excess fuel consumption Qexsp at the time of excess speed Vs is recorded on the memory card 7.

The excess fuel consumption Qexup when an upshift is not performed is the amount of fuel consumed in excess when the operation points of the engine fall outside of the favorable fuel consumption ratio region due to the driver neglecting to perform a speed change operation in spite of being under operating conditions in which an upshift is possible. The excess fuel consumption Qexup when an upshift is not performed is calculated as the difference between the current fuel consumption Q and the fuel consumption Qup expected by performing an upshift. More specifically, first the engine torque Teup [N·m] following an upshift is calculated from the following equation (21).

$$Teup = Te \times \frac{it}{itup} \times \frac{\eta_1}{\eta_1 up} \quad (21)$$

In the equation, it is the current speed ratio, itup is the speed ratio following an upshift, $\eta_1$ is the current transmission efficiency, and $\eta_1$up is the transmission efficiency following an upshift.

The engine output Peup [kW] following an upshift is calculated according to the following equation (22).

$$Peup = \frac{\pi \cdot Teup \cdot Neup}{30 \cdot 1000} \quad (22)$$

The fuel consumption ratio BSFC [g/(kW·hour)] corresponding to the engine torque Teup and engine rotation speed Neup following an upshift is determined with reference to the overall engine performance map, and the expected fuel consumption Qup following an upshift is calculated according to the following equation (23).

$$Qup = \frac{Peup \cdot BSFC \cdot \mathrm{h}}{\rho \cdot 1000} \quad (23)$$

The excess fuel consumption Qexup when an upshift is not performed is obtained by subtracting Qup from the current fuel consumption Q, and the total value thereof is recorded on the memory card 7.

The excess fuel consumption Qexrc caused by racing is the amount of fuel consumed in excess by racing the engine when the vehicle is stationary and the clutch is released. The excess fuel consumption Qexrc due to racing is calculated by first obtaining the output Peidl [kW] during idling according to the following equation (24).

$$Peidl = \frac{\pi \cdot Teidl \cdot Ne}{30 \cdot 1000} \quad (24)$$

The indicated torque Teidl is the torque required for the engine itself to rotate against friction in the main movement system, valve operating system, auxiliary equipment, and the like. The fuel consumption Qidl during idling is calculated by substituting the output Peidl during idling into the following equation (25).

$$Qidl = \frac{Peidl \cdot BSFC \cdot h}{\rho \cdot 1000} \quad (25)$$

The fuel consumption Qexrc due to racing is then calculated by subtracting the fuel consumption Qidl during idling from the current fuel consumption Q, and the total value thereof is recorded on the memory card 7.

The excess fuel consumption Qexidl during idling is the amount of fuel consumed during a period of idling which is longer than a predetermined length of time (20 seconds, for example). The fuel consumption Q when this idling condition is established is directly designated as the excess fuel consumption Qexidl. The total value thereof is recorded on the memory card 7.

A value obtained by adding the excess fuel consumption Qexf due to using excess drive force, the excess fuel consumption Qexsp due to excess speed, the excess fuel consumption Qexup when an upshift is not performed, the excess fuel consumption Qexrc due to racing, and the excess fuel consumption Qexidl due to idling, which were calculated as described above, constitutes the excess fuel consumption Qex. The excess fuel consumption Qex is displayed in an operating conditions display area 43 of the display 4, which is described below.

The excess fuel consumption Qex may be obtained by calculating the amount of fuel consumed when ideal driving as defined in the overall engine performance map is performed, and subtracting this ideal fuel consumption from the actual fuel consumption.

Figure 5:
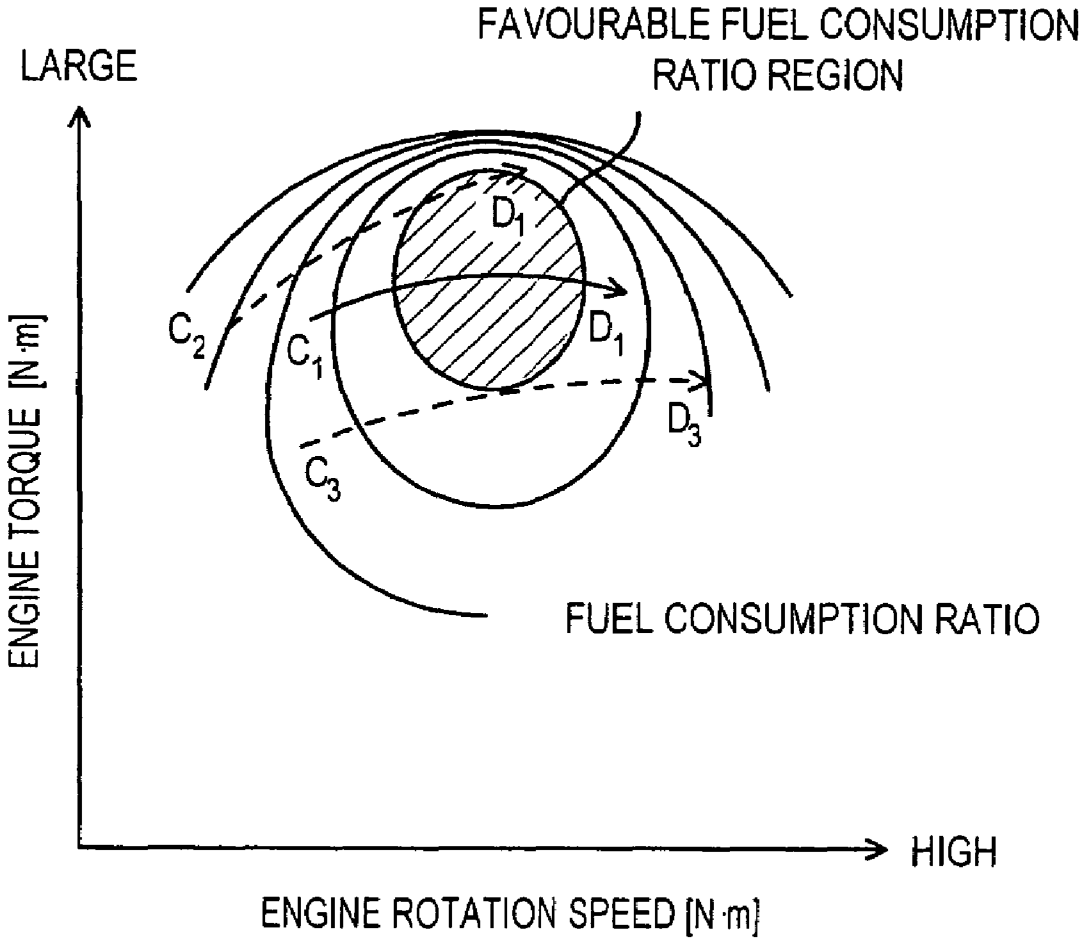
FIG. 5 is a map defining the relationship of the fuel consumption ratio to engine rotation speed and engine torque.

FIG. 5 shows an example of an overall engine performance map. Ideal driving is driving during which, when a speed change operation is performed, the engine operation points pass through the shaded region in the diagram wherein the fuel consumption ratio increases. In FIG. 5, if the operational points of the engine move from C1 to D1 in each gear, then the favorable fuel consumption ratio region can be used effectively. If the gear position that is used is inappropriate, and operation is performed so as to move from C2 to D2 and C3 to D3, for example, fuel is excessively consumed even when the same work is performed. From C3 to D3, rotation speed increases and acceleration time lengthens since sufficient torque cannot be obtained. Ideal driving is therefore driving whereby the operational points of the engine move from C1 to D1 in third gear and then an upshift is performed, the operational points of the engine again move from C1 to D1 in 4th gear and then an upshift is performed to fifth gear, and the operational points of the engine move from C1 to the target vehicle speed.

In order to compute the actual fuel consumption amount, the combination of the engine rotation speed and torque in a certain interval of running is recorded, and the gear that was used is also recorded. On this basis, the actual fuel consumption per hour q [l/hour] is calculated according to the following equation (26), and the fuel consumption can be obtained by integrating q with respect to time.

$$q = BSFC \cdot \frac{\pi \cdot Te \cdot Ne}{30} \cdot \frac{1}{\rho} \cdot \frac{1}{10^6} \quad (26)$$

ρ is the fuel density [kg/l]. In order to calculate the ideal fuel consumption, on the other hand, the same calculation may be performed assuming that the speed change is performed so as to run at operational points proximate to the path from C1 to D1 in FIG. 5 for the same distance and the same time.

(4) Determination of Acceleration and Rapid Acceleration

Acceleration is determined by comparing an acceleration determination value (set to 0.2 [m/sec$^2$], for example) with the acceleration detected by the acceleration sensor 6 or the acceleration calculated from the vehicle speed detected by the vehicle speed signal, and when the detected acceleration exceeds a specified acceleration, it is determined that acceleration has been performed.

When acceleration has been determined, a determination is made as to whether it is rapid acceleration or not. Rapid acceleration is determined by comparing the detected acceleration with a rapid acceleration determination value (set to 0.7 [m/sec$^2$], for example) set in accordance with a driving skill rank of the driver (the rank of the level meter described below, or a rank related to acceleration), and if the detected acceleration exceeds the rapid acceleration determination value, it is determined that rapid acceleration has been performed.

The rapid acceleration determination value is set to a value which decreases as the driving skill rank increases. For example, when the driving skill rank is the lowest rank E, the rapid acceleration determination value is set to 0.7 [m/sec$^2$], and as the rank rises, the rapid acceleration value is automatically updated to a smaller value.

The time in which the acceleration is performed and the time in which the rapid acceleration is performed are respectively recorded in the memory card 7.

(5) Determination of Deceleration and Rapid Deceleration

A determination is made by a similar process as the determination of acceleration and rapid acceleration described above. When the detected deceleration is greater than a deceleration determination value (0.2 [m/sec$^2$], for example), deceleration is determined, and when the deceleration is greater than a rapid deceleration determination value (0.7 [m/sec$^2$], for example), rapid deceleration is determined. The rapid deceleration determination value changes in accordance with the driving skill rank (the rank of the level meter described below or a rank related to deceleration), and is set to a value which decreases as the rank increases. The time in which the deceleration is performed and the time in which the rapid deceleration is performed are respectively recorded on the memory card 7.

(6) Determination of Idling

When the vehicle is continuously stationary in excess of a predetermined length of time X (20 seconds, for example), and the engine rotation speed is lower than an idling determination threshold, it is determined that the vehicle is idling. The predetermined time X is set so as to exclude traffic signal wait time. The idling determination threshold is set to a smaller value than the rotation speed during idleup control to eliminate idleup when the output of the engine is used to drive a crane or other equipment for cargo operations. When it is determined that the vehicle is idling, the idling time is measured and recorded on the memory card 7. The number of times the vehicle stops, the time the vehicle is stopped, the number of times the engine is stopped, the time the engine is stopped, and other factors are also recorded in the memory card 7.

(7) Determination of Excess Speed

Excess speed is determined by comparing the vehicle speed V and the specified vehicle speed Vs. When the vehicle speed V exceeds the specified vehicle speed Vs, it is determined that the vehicle is running at excess speed. The specified vehicle speed Vs is predetermined and set to 50 [km/hour] for running on ordinary roads and 80 [km/hour] for running on expressways. When it is determined that the vehicle is running at excess speed, the time run at excess speed is recorded on the memory card 7. The time run on an ordinary road and the time run on an expressway are also recorded on the memory card 7.

(8) Determination of the Possibility of an Upshift

The engine rotation speed and maximum drive force when a single speed upshift is performed are calculated by means of a similar process to that of step S7 in FIG. 4, and when the engine rotation speed assuming an upshift has been performed is greater than a specified value and the maximum drive force following an upshift is greater than the current running resistance R (Rs+RI+Rr), it is determined that an upshift is possible. When it has been determined that an upshift is possible, the time during which it is determined that an upshift is possible is recorded on the memory card 7. The gear position used during acceleration and the time run in a gear position other than the gear positions at which an upshift is impossible (second, third, and fourth gears in a five advance speed transmission) are also recorded on the memory card 7.

(9) Determination of Constant-Speed Running

A determination as to whether the vehicle is running at a constant speed is made based on the excess drive force. It is determined that the vehicle is running at a constant speed when the excess drive force is small and the level meter 41 described below is not lit, or when only the green squares thereof are lit for longer than a predetermined time period. The time during which it is determined that the vehicle is running at a constant speed is recorded on the memory card 7. The complete running time is also recorded on the memory card 7 in order to check the frequency of constant-speed running in relation to the complete running time.

(10) Determination of Racing

A determination as to whether racing has occurred is made on the basis of the vehicle speed, the engine rotation speed, and the accelerator operation amount. It is determined that racing has occurred when the engine rotation speed and accelerator operation amount are not zero when the vehicle speed is zero. The number of times racing occurs is recorded on the memory card 7. The number of times the vehicle is stationary is also recorded on the memory card 7.

4. Display and Recording of Operating Conditions

Calculation and determination of the operating conditions are performed by the calculation unit 3 as described above, and the results thereof are displayed in real time on the display 4 of the onboard unit 1.

Figure 6:
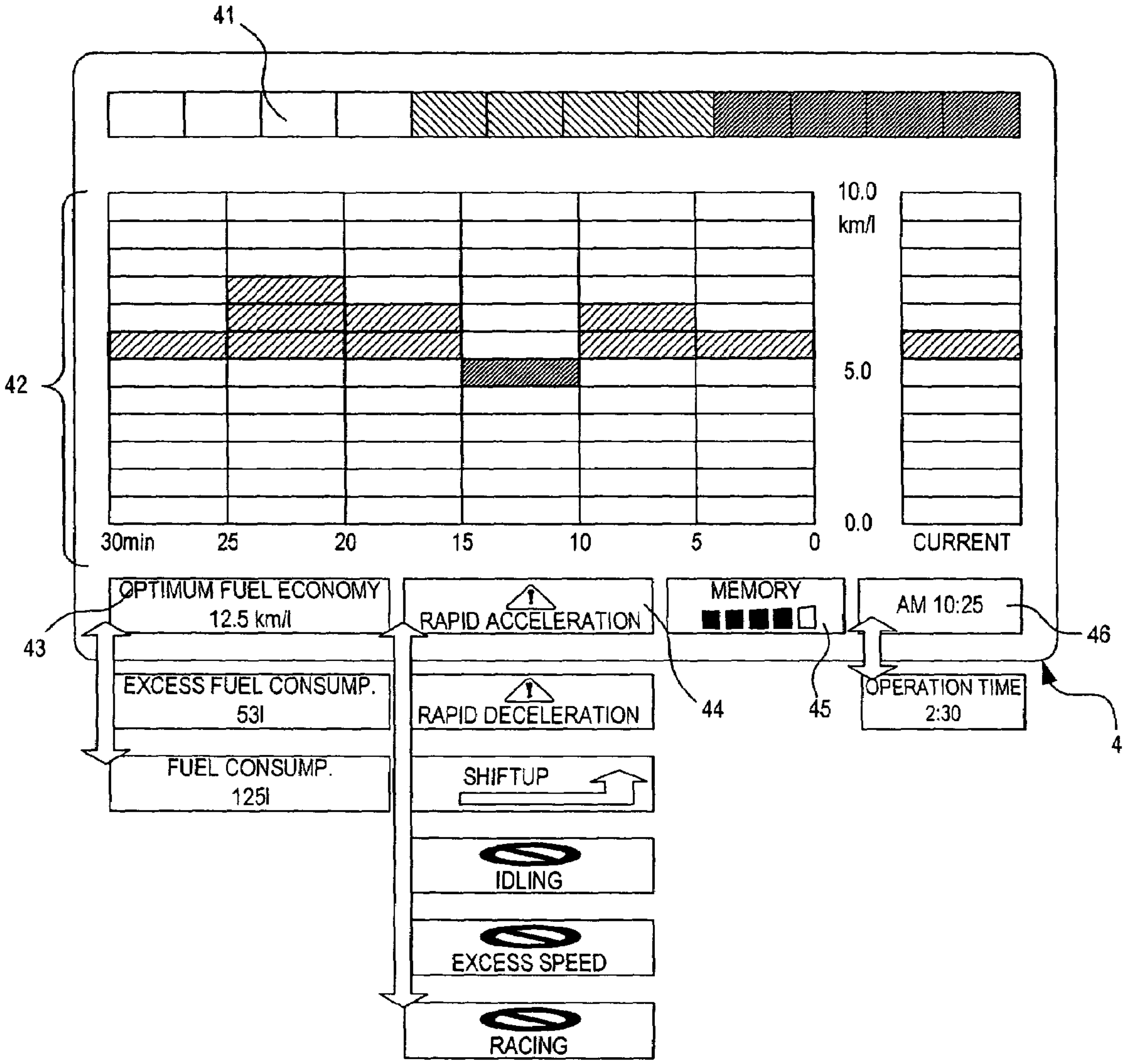
FIG. 6 shows the constitution of a display.

FIG. 6 shows the specific configuration of the display 4. The display 4 comprises a level meter 41 for displaying the excess drive force ratio and other data, a fuel economy display area 42 for displaying the current and past fuel economy, an operating conditions display area 43 for displaying operating conditions such as the excess fuel consumption, a warning display area 44 for displaying warning messages when rapid acceleration is performed or the like, a remaining memory display area 45 for displaying the free capacity of the memory card 7, and a time display area 46 for selectively displaying the continuous operation time and the current time. Although the level meter 41 may also display values (ratios computed in the steps S11, S13 in FIG. 4) other than the excess drive force ratio, the description that follows will center on a case in which the excess drive force ratio is displayed.

The level meter 41 displays the magnitude of the excess drive force ratio in a bar graph format. The level meter 41 comprises 12 squares aligned in a row. As the excess drive force ratio increases, the lights light up beginning with the squares on the left side of the diagram, and the illumination color of each square and the number of squares lit in accordance with the excess drive force ratio are changed in accordance with the driving skill rank (the level meter rank to be described below).

Figure 7:
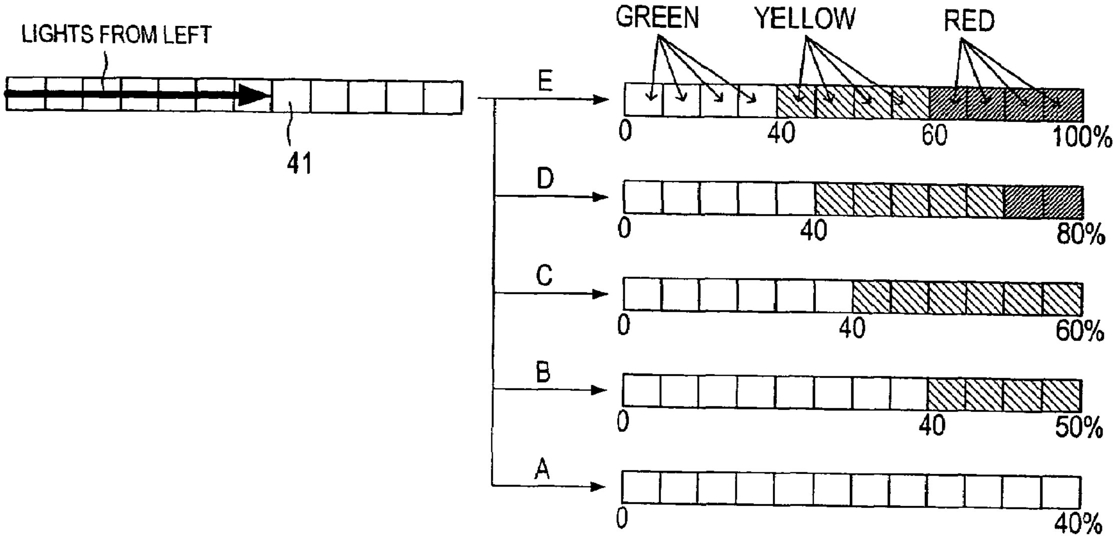
FIG. 7 shows a situation in which the display format of a level meter is modified.

FIG. 7 shows a situation in which the display format of the level meter 41 is changed in accordance with the driving skill rank. The level meter 41 comprises 12 separate squares divided into the colors green, yellow, and red. At the lowest rank E, the unlit meter is set to correspond to a 0% excess drive force ratio and the completely lit meter is set to correspond to a 100% excess drive force ratio. As the rank increases, the excess drive force ratio when the meter is completely lit is set to decrease such that at rank D, the excess drive force ratio is 80% and at rank C the excess drive force ratio is 60%. The value of the excess drive force ratio at full illumination then grows gradually smaller such that at rank A, the excess drive force ratio is 40%.

If it is assumed that the excess drive force ratio is displayed as green from 0% to 40%, yellow from 40% to 60%, and red from 60% to 100%, the number of green, yellow, and red squares at the lowest rank E is four each. When squares are lit in order from the left side corresponding to increases in excess drive force ratio, the driver attempts to drive so that the red lamps (or the yellow lamps) are illuminated as little as possible. Hence the target excess drive force ratio of the driver at this time is around 40% to 60%.

When the driving skill rank rises and the green display area increases, the driver then attempts to drive so that the yellow lights are illuminated as little as possible. Hence the target excess drive force ratio of the driver at this time is approximately 40% and the aims of the driver are higher than when at rank E.

When the rank rises further to reach the highest rank A and the color of all the lit squares is green, the driver then attempts to drive so as to reduce the number of green lights that are lit. Hence the target excess drive force ratio of the driver at this time falls below 40%, and the aims of the driver are again raised higher.

Changing the display format in accordance with the driving skill rank allows a suitable target for the driving skill of the driver to be set, and hence improvements in the driving skill of both proficient and unskilled drivers can be expected.

Referring to FIG. 6, the display 4 will be described in greater detail. The current fuel economy and changes in the fuel economy over the previous thirty minutes are displayed in the fuel economy display area 42, and thus the driver can understand how the fuel economy changes due to his/her own driving operations. When the fuel economy is better than standard fuel economy (5.0 [km/l], in this case), a number of squares on the upper side of the center light up in accordance with the difference in relation to the standard fuel economy, and when the fuel economy is worse than the standard fuel economy, a number of squares on the lower side of the center light up in accordance with the difference in relation to the standard fuel economy.

In addition to the calculated excess fuel consumption, the optimum fuel economy, the amount of fuel consumed up to that point, and other data are selectively displayed in the operating conditions display area 43.

When it is determined according to the determination processes described above that rapid acceleration has occurred, rapid deceleration has occurred, an upshift is possible, the vehicle is currently idling, or racing has occurred, then a warning message is displayed to the driver in the warning display area 44 in accordance with the content of the determination. When a warning message is displayed, the excess fuel consumption also increases, and thus the driver can learn the specific driving operation that has worsened the fuel economy and this can serve as a reference for the driver to improve driving operations. The warning method may be a method of issuing a warning sound or a method of playing a voiced warning message.

5. Analysis of Operating Conditions

After the run is complete, the various data relating to the operating conditions recorded on the memory card 7 are read to the monitoring computer 2, and after various analysis processes have been implemented thereon, the data are displayed on a display **2*d* of the monitoring computer 2**.

Figure 8:
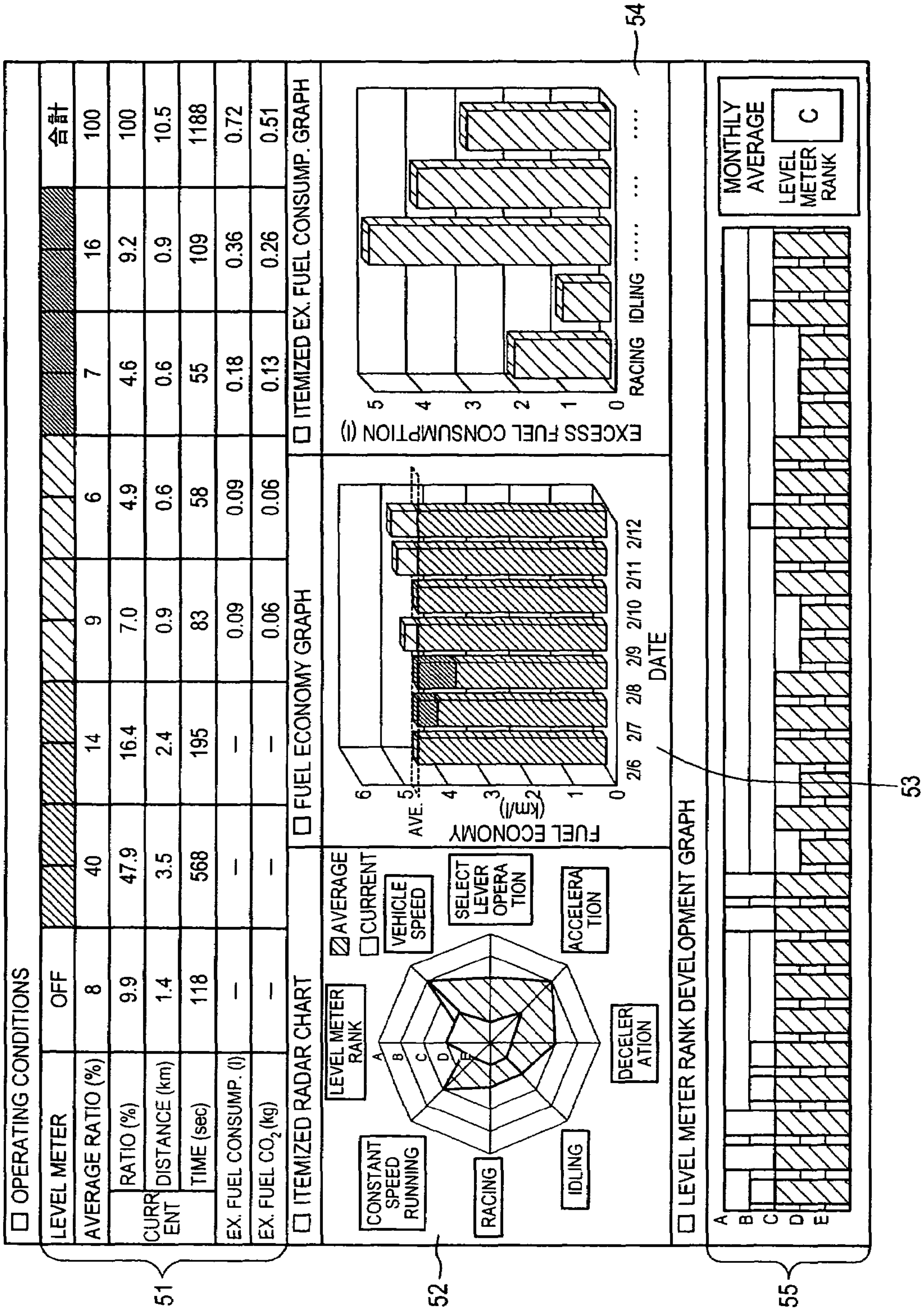
FIG. 8 shows the content displayed on the display of a monitoring computer.

FIG. 8 shows a screen displayed on the display **2*d* of the monitoring computer 2. An operating conditions display area 51, an itemized radar chart area 52, a predetermined time period fuel economy graph area 53, an itemized excess fuel consumption graph area 54, and a level meter rank development graph area 55 are displayed on the display 2*d***.

In the operating conditions display area 51, the illumination ratio of the squares on the level meter 41, the distance traveled at each square, the driving time, the excess fuel consumption amount, and an excess fuel $CO_2$ amount are displayed. The excess fuel $CO_2$ amount is the amount of $CO_2$ discharged in excess due to the consumption of the excess fuel consumption amount, and is calculated as the amount of $CO_2$ generated by the combustion of the excess fuel consumption amount.

In the itemized radar chart area 52, the current and past ranks (A to E) of the driver are displayed in relation to each of the items "level meter rank", "idling", "racing", "vehicle speed", "select lever operation", "acceleration", "deceleration", and "constant speed running".

The rank displayed for the item "level meter rank" is an overall rank (level meter rank) determined by averaging the ranks of each of the items to be described below. The display format of the level meter 41 and the determination thresholds for rapid acceleration and rapid deceleration are modified in accordance with the level meter rank.

Figure 9:
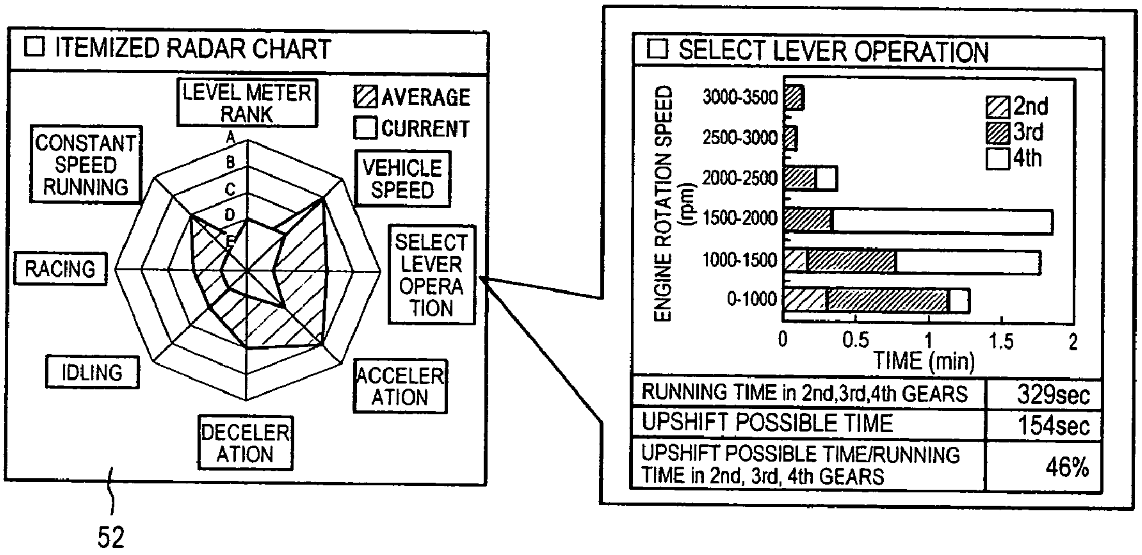
FIG. 9 shows an itemized radar chart.

By aligning a cursor on an item other than "level meter rank" and clicking the button of an input device of the monitoring computer 2 such as a mouse, a window displaying itemized details is opened as shown in FIG. 9.

Figures 10, 11:
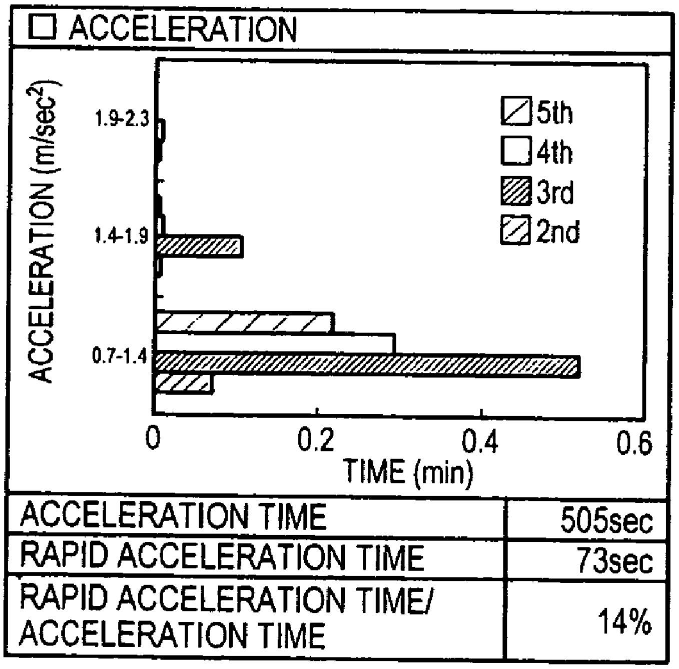
FIG. 10 shows a screen which opens when an "idling" item on the itemized radar chart is clicked.
FIG. 11 shows a screen which opens when an "acceleration" item on the itemized radar chart is clicked.

FIG. 10 shows the content of a window which opens when the "idling" item is clicked. In the window, "number of stoppages", "stoppage time", "number of engine stoppages", "engine stoppage time", "idling time", and "idling time/stoppage time" are displayed.

The "idling time" is a time period during which the vehicle is stationary while the engine is running and the engine rotation speed remains continuously under an idling determination threshold for over a predetermined time amount X (20 seconds, for example). The "stoppage time" is a time period during which the vehicle is stationary for longer than the predetermined time amount X. The "engine stoppage time" is a value obtained by subtracting the idling time from the stoppage time.

The "idling time/stoppage time" item is the proportion of idling time to stoppage time. It can be said that the smaller this value is, the more the driver is taking care not to perform idling by switching off the engine. The "idling" rank is determined according to this value, and as the value decreases, the "idling" rank of the driver is set to a higher level.

FIG. 11 shows the content of a window which opens when the "acceleration" item is clicked. In this window, "acceleration time", "rapid acceleration time", "rapid acceleration time/overall acceleration time" are displayed alongside a graph showing relationships between the gear position in which acceleration was performed, the acceleration, and the amount of time during which acceleration was performed.

The "acceleration time" is the sum total of the time during which acceleration is performed to a greater degree than an acceleration determination value (0.2 [m/sec$^2$], for example). The "rapid acceleration time" is the time during which acceleration is performed to a greater degree than a rapid acceleration determination value (0.7 [m/sec$^2$], for example) at which a rapid acceleration warning message is displayed. The "rapid acceleration time/acceleration time" item illustrates the proportion of rapid acceleration time to acceleration time. As this value decreases, the frequency of the rapid acceleration grows smaller, and thus the driving skill of the driver relating to "acceleration" increases. The "acceleration" rank is determined on the basis of this value.

Figure 12:
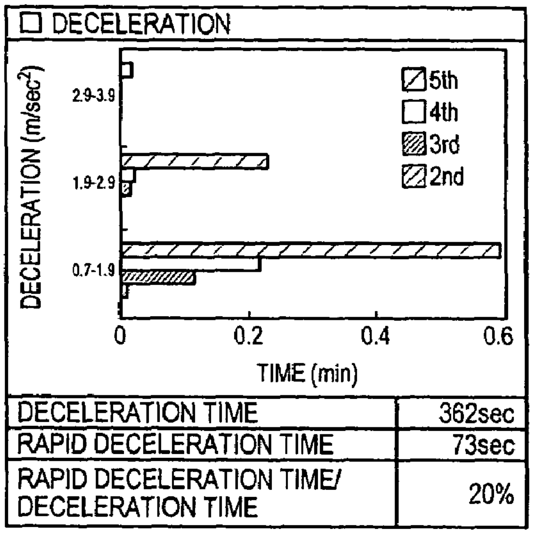
FIG. 12 shows a screen which opens when a "deceleration" item on the itemized radar chart is clicked.

FIG. 12 shows the content of a window which opens when the "deceleration" item is clicked. The "deceleration time", "rapid deceleration time", and "rapid deceleration time/deceleration time" are displayed therein alongside a graph showing relationships between the gear in which deceleration was performed, the deceleration, and the amount of time during which deceleration was performed.

The "deceleration time" is the sum total of the time during which deceleration is performed to a greater degree than a deceleration determination value (0.2 [m/sec$^2$], for example). The "rapid deceleration time" is the time during which deceleration is performed to a greater degree than a rapid deceleration determination value (0.7 [m/sec$^2$], for example) at which a rapid deceleration warning message is displayed. The "rapid deceleration time/deceleration time" item illustrates the proportion of rapid deceleration time to deceleration time. As this value decreases, the frequency of the rapid deceleration grows smaller, and thus the driving skill of the driver relating to "deceleration" increases. The "deceleration" rank is determined on the basis of this value.

Figure 13:
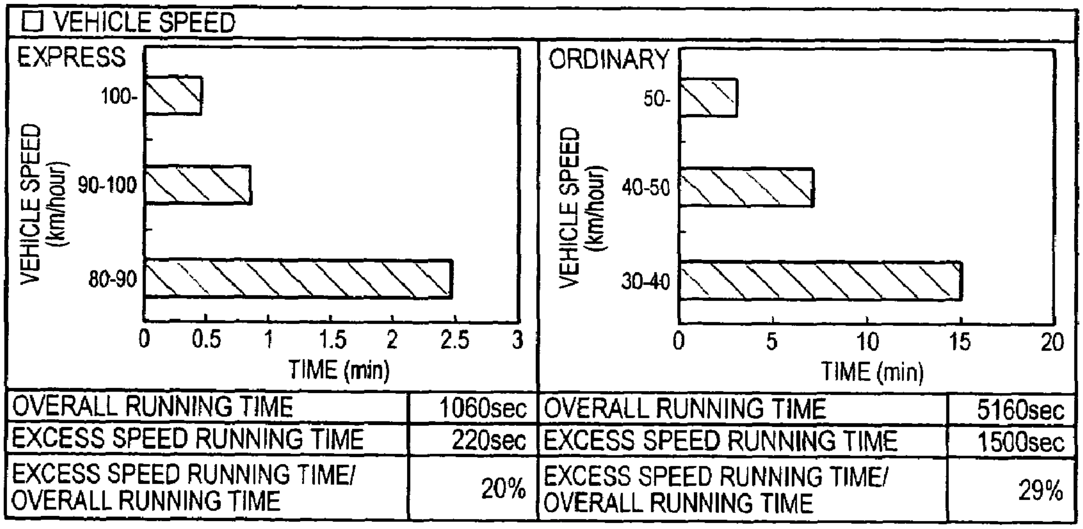
FIG. 13 shows a screen which opens when a "vehicle speed" item on the itemized radar chart is clicked.

FIG. 13 shows the content of a window which opens when the "vehicle speed" item is clicked. In the window, "overall running time", "excess speed running time", and "excess speed running time/overall running time" are displayed divided into ordinary roads and expressways. A graph showing the relationship between vehicle speed and running time is also displayed.

The "overall running time" is the sum total of the time during which the vehicle runs on an ordinary road or an expressway at a higher vehicle speed than 0 [km/hour]. The "excess speed running time" is the time during which the vehicle runs on an ordinary road or expressway at a higher vehicle speed than the specified vehicle speed. The "excess speed running time/overall running time" item is the proportion of excess speed running time to overall running time. The smaller this value is, the more the driver is keeping to the specified vehicle speed. The "speed" rank is determined on the basis of this value.

Figures 14, 15, 16:
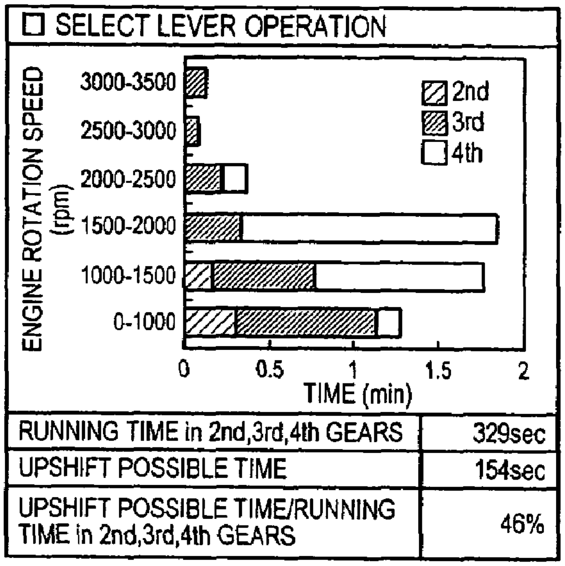
FIG. 14 shows a screen which opens when a "select lever operation" item on the itemized radar chart is clicked.
FIG. 15 shows a screen which opens when a "constant speed running" item on the itemized radar chart is clicked.
FIG. 16 shows a screen which opens when a "racing" item on the itemized radar chart is clicked.
Figure 17:
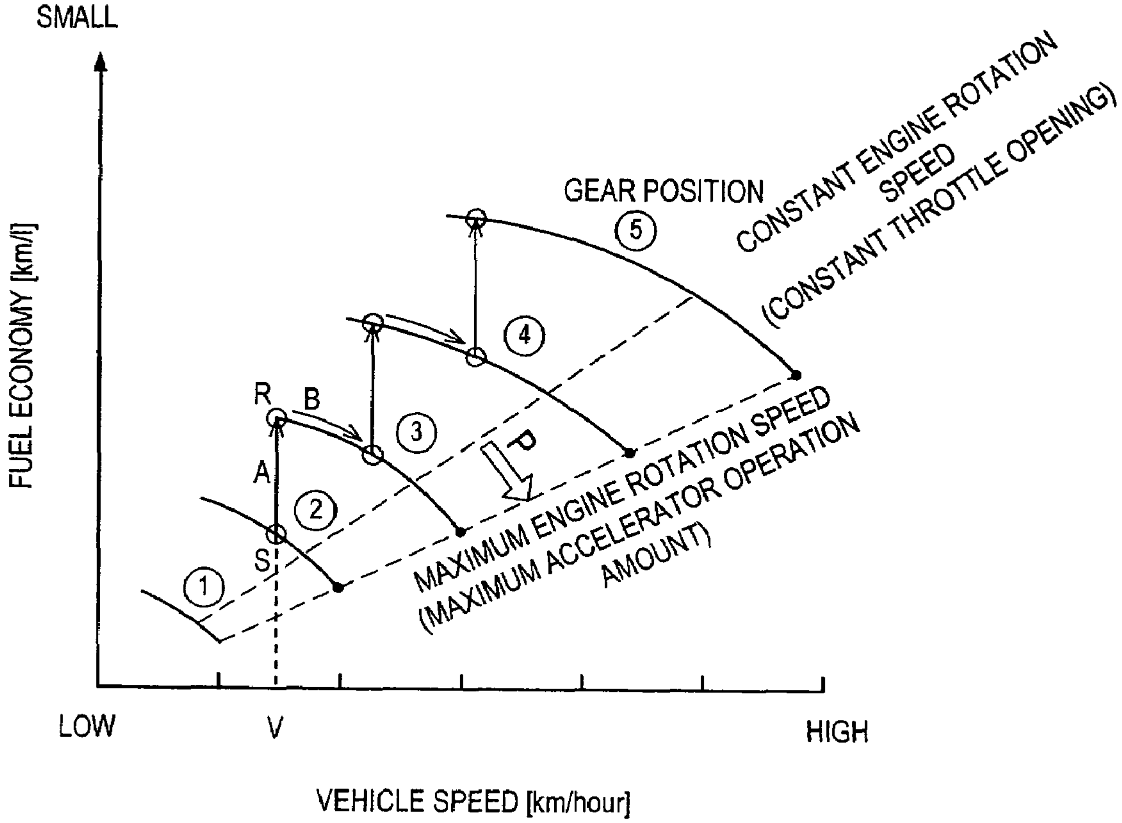
FIG. 17 is a view illustrating ideal driving.
Figure 18:
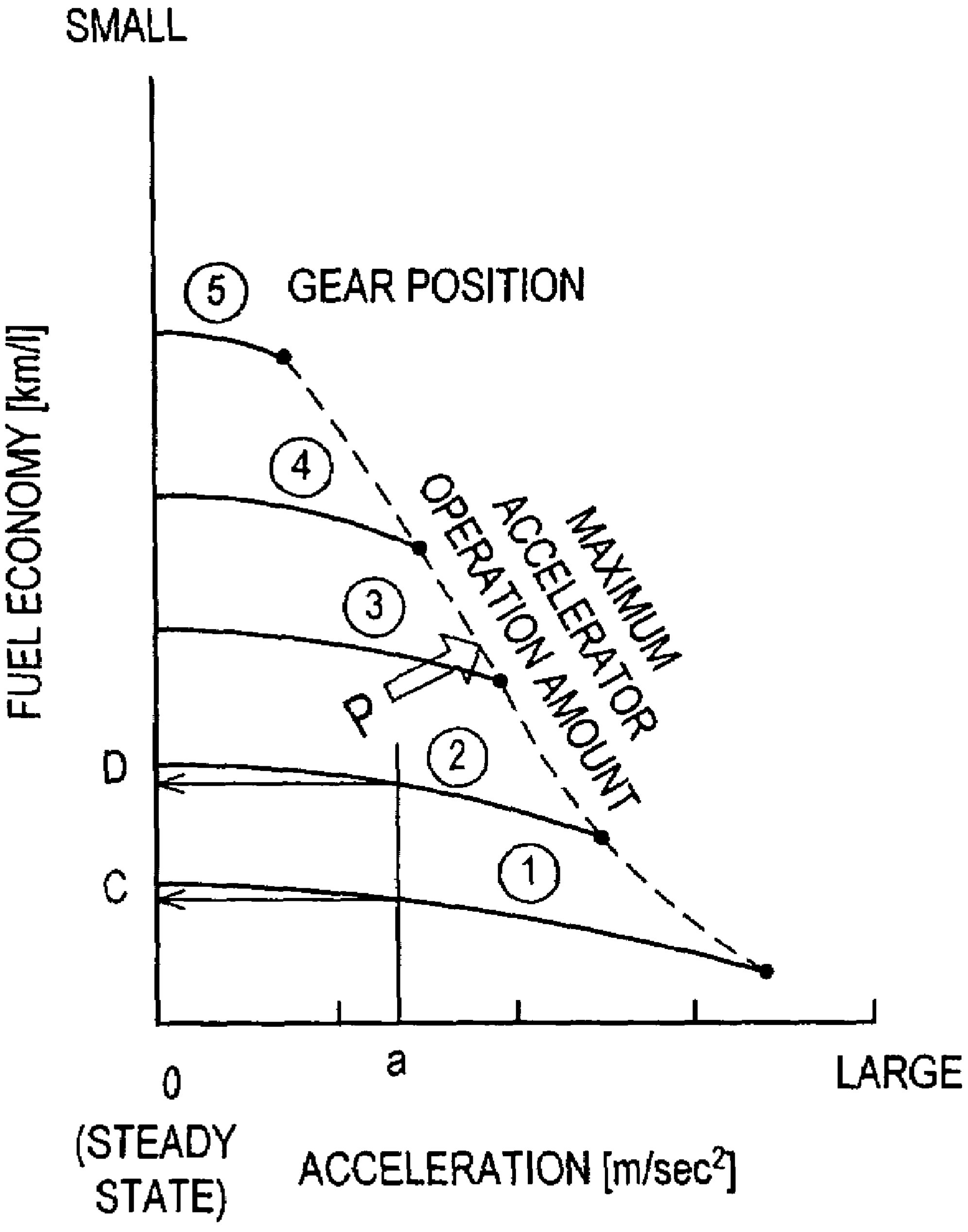
FIG. 18 is a view illustrating ideal driving.
Figure 19:
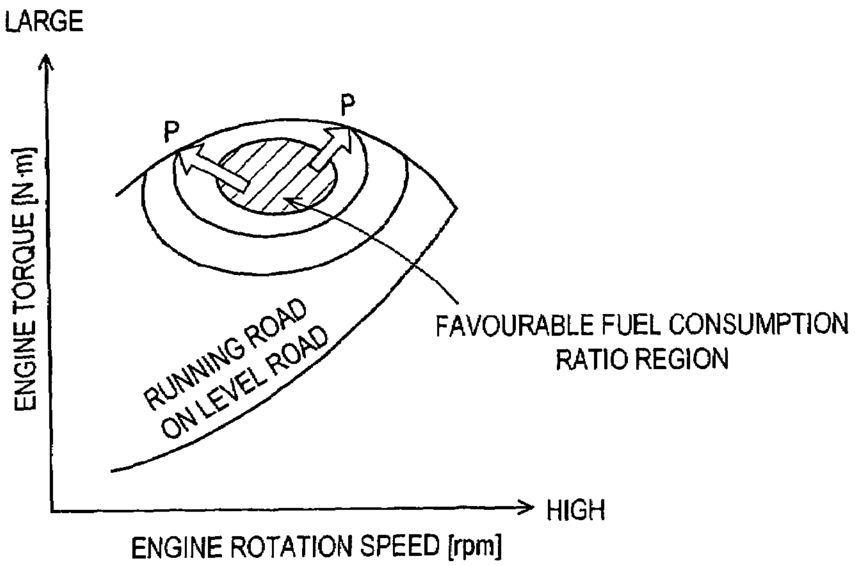
FIG. 19 is a map defining the relationship of the fuel consumption ratio to engine rotation speed and engine torque.
Figure 20:
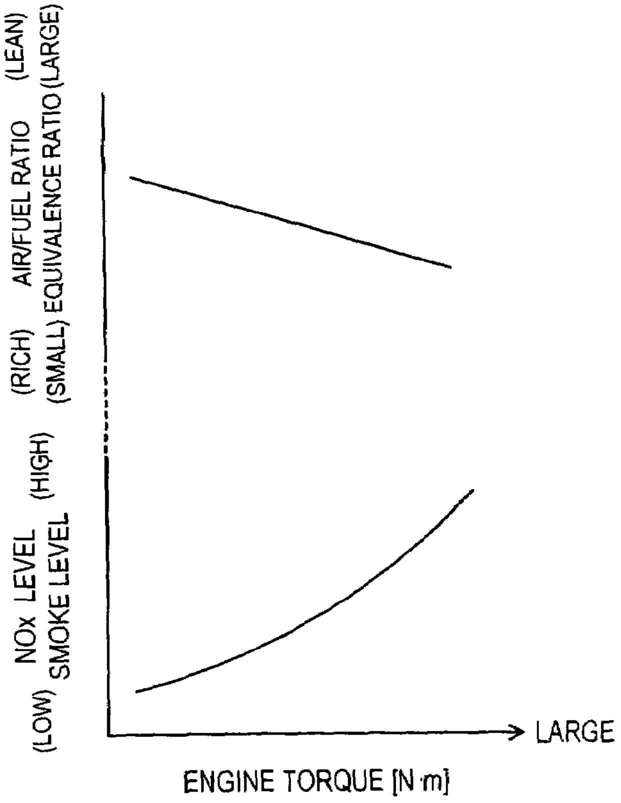
FIG. 20 is a table defining the relationship of engine torque to air/fuel ratio and equivalence ratio, and the relationship of engine torque to NOx and smoke levels.

FIG. 14 shows the content of a window which opens when the "select lever operation" item is clicked. In the window, "running time in 2nd, 3rd, 4th gears", "upshift possible time", and "upshift possible time/running time in 2nd, 3rd, 4th gears" are displayed.

A graph showing relationships between the gear position, engine rotation speed, and running time is also displayed, whereby the gear position in which the vehicle often runs at a high engine rotation speed can be understood visually.

The "running time in 2nd, 3rd, 4th gears" is the sum total of the time during which the vehicle runs in second, third, or fourth gear in which a speed change to a higher gear is possible (in the case of a five forward speed transmission). The "upshift possible time" is the time during which the vehicle runs without performing an upshift regardless of the fact that the conditions for an upshift have been satisfied. The "upshift possible time/running time in 2nd, 3rd, 4th gears" item is the proportion of upshift possible time to running time in second, third, and fourth gears, and as this value decreases, it is indicated that the driver is performing upshifts with appropriate timing, or in other words that the driver is performing upshifts quickly when an upshift possible state is entered. The "select lever operation" rank is determined on the basis of this value.

FIG. 15 shows the content of a window which opens when the "constant speed running" item is clicked. In the window, "constant speed time", "running time", and "constant speed time/running time" are displayed.

The "constant speed time" is the time during which constant speed conditions (no illumination of the level meter 41 or illumination of only the green squares thereon) are satisfied for longer than a predetermined amount of time. The "running time" is the time during which the vehicle speed satisfies a condition of being over 0 [km/hour]. The "constant speed time/running time" item is the proportion of constant speed time to running time, and as the value thereof decreases, the constant speed running frequency increases. The "constant speed running" rank is determined on the basis of this value.

FIG. 16 shows the content of a window which opens when the "racing" item is clicked. In this window, the items "number of racing times", "number of stoppages", and "number of racing times/number of stoppages" are displayed.

The "number of racing times" is the number of times the racing condition (engine rotation speed and accelerator operation amount above zero when the vehicle speed is zero) is satisfied. The "number of stoppages" is a total number of times wherein one time is measured as the time from the beginning of a vehicle speed increase from a vehicle speed of 0 [km/hour] to the following vehicle speed increase from a vehicle speed of 0 [km/hour]. The "number of racing times/number of stoppages" item is the proportion of racing times to stoppage times, and the smaller this value is, the less the driver is performing racing. The "racing" rank is determined on the basis of this value.

The display content on the display 2*d* of the monitoring computer 2 will be described further with reference to FIG. 8.

In the predetermined time period fuel economy graph area 53, the fuel economy in weekly or other units is displayed in a bar graph format alongside previous average fuel economy value. In the itemized excess fuel consumption graph area 54, excess fuel consumption is displayed according to cause so that the cause of the excess fuel consumption can be understood.

In the level meter rank development graph area 55, level meter ranks within a predetermined time period, for example in monthly units, are displayed in a bar graph format, and an average rank value for that time period is also displayed.

The operating conditions are displayed on the display 2*d* of the monitoring computer 2 as is or in an adjusted format. In so doing, a monitor can detect the operating conditions of a driver more specifically, and can use the display as an objective judgment tool during an evaluation of the operating conditions.

Since the operating conditions are displayed as specific numerical values or rankings, a specific target value or monitoring standard for improvement of the operating conditions may be set. By observing his/her own displayed analysis results, the driver is aided in improving his/her driving skill, and by observing the operation conditions of a proficient driver, the driving skill of the proficient driver may help to instruct the unskilled driver.

The data displayed on the display 2*d* of the monitoring computer 2 as described above are examples of displayed data, and data other than the data cited here may be displayed in accordance with the needs of the monitor.

An embodiment of this invention was described above. However, the constitution described above is merely an example of a system to which this invention is applied and does not limit the scope of this invention.

This invention may be applied to a system with a different constitution to the constitution illustrated here. For example, the vehicle database may be installed within the onboard unit 1 such that vehicle selection and automatic generation of the overall performance map are performed by the onboard unit 1. Analysis and display of the recorded operating conditions may also be performed using the onboard unit 1.

The overall engine performance map is generated on the basis of fuel consumption ratio characteristic data prepared in advance and a known actual fuel consumption ratio under certain running conditions of the engine which is subject to evaluation. However, if the overall performance map is available by other means, then that map may be used.

Data transactions between the onboard unit 1 and monitoring computer 2 may be performed using a method other than the passing of a memory card, for example by passing a magnetic disk, or by wireless communication.

What is claimed is:

1. An evaluation system for operating conditions applied to a vehicle, comprising:

a controller which functions to:

determine whether or not an operation which worsens fuel economy has been performed;

when it is determined that the operation which worsens fuel economy has been performed, respectively calculate an actual amount of consumed fuel and an amount of fuel which would have been consumed had the operation which worsens fuel economy not been performed; and calculate an amount of fuel consumed in excess due to the operation which worsens fuel economy by subtracting the amount of fuel which would have been consumed had the operation which worsens fuel economy not been performed from the actual amount of consumed fuel, the evaluation system further comprising a display device for displaying the calculated excess fuel consumption;

wherein the controller further functions to determine that the operation which worsens fuel economy has been performed when the vehicle accelerates by a greater acceleration than a predetermined rapid acceleration determination value; and wherein the controller further functions to:

rank the driving skill of a driver based on the frequency with which operations which worsen fuel economy are performed; and reduce the rapid acceleration determination value as the driving skill rank increases.

2. An evaluation system for operating conditions applied to a vehicle, comprising:

a controller which functions to:

determine whether or not an operation which worsens fuel economy has been performed;

when it is determined that the operation which worsens fuel economy has been performed, respectively calculate an actual amount of consumed fuel and an amount of fuel which would have been consumed had the operation which worsens fuel economy not been performed; and calculate an amount of fuel consumed in excess due to the operation which worsens fuel economy by subtracting the amount of fuel which would have been consumed had the operation which worsens fuel economy not been performed from the actual amount of consumed fuel, the evaluation system further comprising a display device for displaying the calculated excess fuel consumption;

wherein the controller further functions to determine that the operation which worsens fuel economy has been performed when the vehicle decelerates by a greater deceleration than a predetermined rapid deceleration determination value; and wherein the controller further functions to:

rank the driving skill of a driver based on the frequency with which operations which worsen fuel economy are performed; and reduce the rapid deceleration determination value as the driving skill rank increases.

3. An evaluation system for operating conditions applied to a vehicle, comprising:

a controller which functions to:

determine whether or not an operation which worsens fuel economy has been performed;

when it is determined that the operation which worsens fuel economy has been performed, respectively calculate an actual amount of consumed fuel and an amount of fuel which would have been consumed had the operation which worsens fuel economy not been performed; and calculate an amount of fuel consumed in excess due to the operation which worsens fuel economy by subtracting the amount of fuel which would have been consumed had the operation which worsens fuel economy not been performed from the actual amount of consumed fuel, the evaluation system further comprising a display device for displaying the calculated excess fuel consumption;

wherein the controller further functions to:

calculate a drive force of the vehicle based on the vehicle operating conditions;

calculate an excess drive force by subtracting a running resistance from the calculated drive force; and calculate an excess drive force ratio by dividing the excess drive force by a drive force at full load, and the display device displays the calculated excess drive force ratio.

4. The system as defined in claim 3, wherein the controller further functions to:

determine whether or not the vehicle is running at a higher vehicle speed than the specified vehicle speed;

calculate an air resistance actually faced by the vehicle based on a current vehicle speed;

calculate an air resistance faced by the vehicle when running at the specified vehicle speed;

calculate an excess air resistance by subtracting the air resistance received when running at the specified vehicle speed from the actually faced air resistance; and when it is determined that the vehicle is running at a higher vehicle speed than the specified vehicle speed, calculate as an excess drive force a value obtained by adding the excess air resistance to a value obtained by subtracting a running resistance from the calculated drive force.

5. The system as defined in claim 3, wherein the controller further functions to:

determine whether or not an upshift is possible based on the driving conditions of the vehicle at present and following an upshift;

calculate a fuel consumption amount assuming an upshift has been performed based on the operating conditions of the vehicle following an upshift;

calculate a reduced fuel consumption amount assuming an upshift has been performed by subtracting the fuel consumption following an upshift from a current fuel consumption; and when an upshift is possible, calculate as the excess drive force a value obtained by converting the reduced fuel consumption amount reduced by an upshift into a drive force.

6. The system as defined in claim 3, wherein the controller further functions to rank the driving skill of a driver based on the frequency with which operations which worsen fuel economy are performed, and the display device modifies a display format of the excess drive force ratio in accordance with the driving skill rank.

7. The system as defined in claim 6, wherein the display device displays the excess drive force ratio in a bar graph format such that the length of the displayed bars increases as the driving skill rank rises even at an identical excess drive force ratio.

* * * * *